Aug. 9, 1932.　　　　　A. KONOFF　　　　　1,870,572
DOLL'S EYES
Filed May 2, 1930　　　2 Sheets-Sheet 1
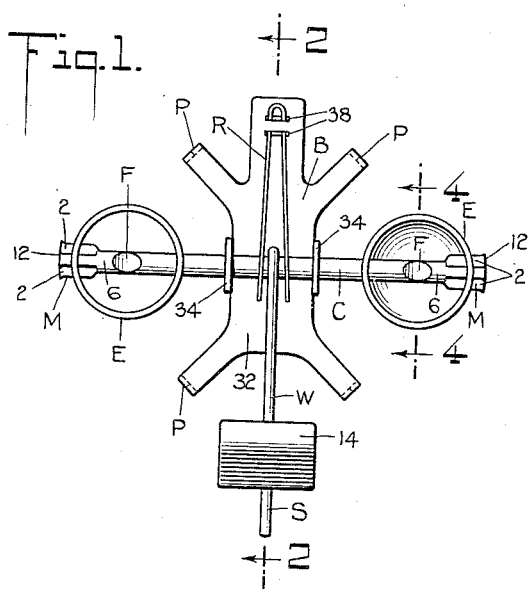
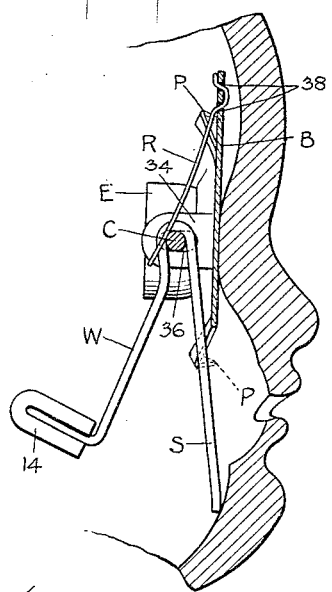
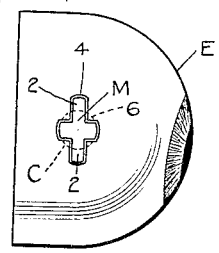
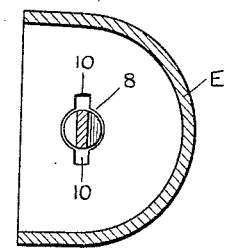
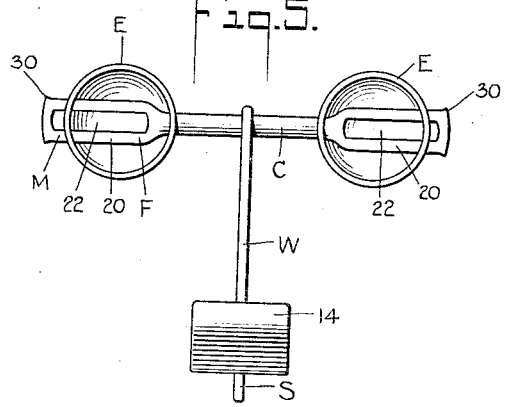
INVENTOR
Alexander Konoff
BY Cavanagh & James
ATTORNEYS Aug. 9, 1932.    A. KONOFF    1,870,572
DOLL'S EYES
Filed May 2, 1930    2 Sheets-Sheet 2
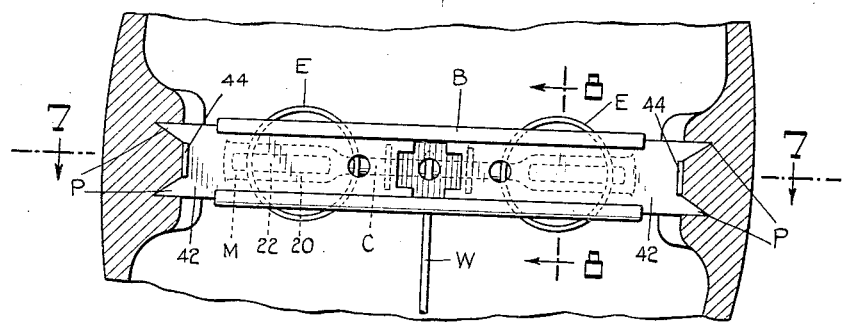
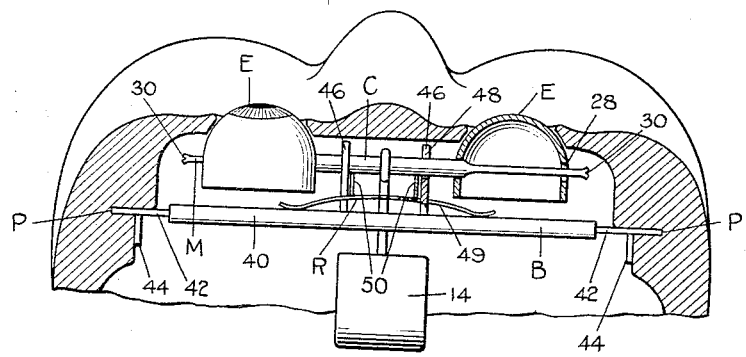
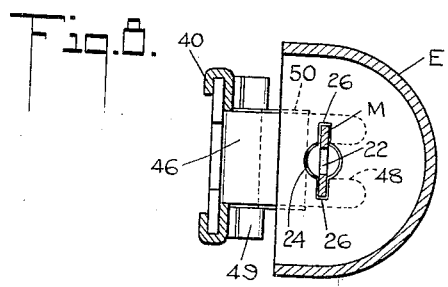
INVENTOR
Alexander Konoff
BY
Cavanagh & James
ATTORNEYS Patented Aug. 9, 1932

1,870,572

UNITED STATES PATENT OFFICE

ALEXANDER KONOFF, OF BROOKLYN, NEW YORK, ASSIGNOR, BY MESNE ASSIGNMENTS, TO MARGON CORPORATION, OF NEW YORK, N. Y., A CORPORATION OF NEW YORK

DOLL'S EYES

Application filed May 2, 1930. Serial No. 449,127.

This invention relates to doll's eyes, and more particularly to eye sets of the movable type.

Movable eye sets are well known and widely used in the more expensive class of dolls. They have not come very widely into use for cheap dolls because of the expense of the eye set and the cost of the labor needed to apply the same to the doll's head. The latter cost is greater than might be anticipated because of the necessary preliminary adjustment of the eyes to accurately fit the eye sockets in the doll's head.

The object of the present invention resides, generally, in the provision of a movable eye set which will be exceedingly simple and inexpensive to manufacture and which will provide all of the necessary adjustments of the eyes to fit the eye sockets, either automatically or in a simple and facile manner, with a view to making it possible to market a cheap class of dolls provided with movable eyes which accurately fit the eye sockets in the doll's head.

One of the important adjustments of the eyes is the spacing therebetween, because the distance between the eyes must fit that between the eye sockets in order to obtain a close fit of the eyes in the eye sockets. Accordingly, one of the primary objects of the present invention is to provide for automatic adjustment of the spacing between the eyes to fit that between the eye sockets, and this I do by providing a cross rod and a pair of eyes with mating means on said cross rod and eyes, and causing the eyes to rotate with the cross rod but permitting them to reciprocate freely along the cross rod. More specifically, I prefer to feather the cross rod and spline the eyes so that the eyes may automatically assume the spacing of the eye sockets although forced to rotate with the cross rod.

It sometimes happens that due to inaccuracies in the manufacture of the doll's head and shrinkage of material of the same, the eye sockets are imperfectly aligned, so that a slight preliminary adjustment of one eye relative to the other may be necessary. This preliminary adjustment may also be necessitated by inaccuracies in the manufacture of the eye set itself. Regardless of cause, the fact is that to obtain a natural life-like appearance adjustment may be needed. This adjustment sometimes requires a slight rotation or twisting of one eye with respect to the other, so that the eyes will look forward properly. In other cases, a simple bending movement of one eye axis with respect to the other, which may be termed a transverse adjustment, in contradistinction to a rotational adjustment, may be needed so that the eyes will look ahead and will focus in a natural manner and not be cross-eyed or wall-eyed in appearance. These adjustments are sometimes entirely unnecessary and at other times are both needed on a single eye set. Accordingly, another object of my invention is to make possible either or both of the rotational and transverse adjustments of one eye with respect to the other, and this is most simply obtained by making the cross rod sufficiently weak to permit of the adjustment, or, more preferably, intentionally weakening the same at points near the eyes to permit of the desired twisting or bending adjustment.

The eyes or eye shells are usually painted flesh color above the pupils of the eyes so as to better simulate closed eyelids when the eyes are turned downwardly to the closed position. Another adjustment which must be made when mounting movable eyes in a doll's head relates to the limits of the turning movement of the eyes, for the eye when open should have the pupils thereof looking forward and not downward which would expose the flesh colored portion of the eyeball, nor upward which would conceal a portion of the pupils of the eyes. Accordingly, further objects of the present invention are to provide stop means for limiting the movement of the eyes and to make the limit set thereby adjustable. This object is fulfilled by the simple expedient of bending the weight wire, which must anyway be attached to the cross rod, downwardly to form stop means which contact with the forward portion of the doll's head when the eyes are open. The desired adjustment of the opening movement is obtained by making the wire bendable so that its position with respect to the cross rod and weight wire may be altered by simply moving it toward or from the latter.

I have found that the foregoing construction with the adjustments already mentioned is amply sufficient to obtain an accurate fit of the eye within the eye sockets of the doll's head, particularly if the support of the eye with respect to the eye sockets is made resilient so that the eyes are yieldably urged into close contact with the walls of the eye sockets. Accordingly, a further object of my invention is to provide, in combination with the eye set so far described consisting simply of a cross rod, a pair of eyes and a weight wire, a supporting means therefor which may be readily and securely mounted within the doll's head and which will resiliently urge the cross rod, and with it the eyes, into close engagement with the eye sockets of the doll's head.

To the accomplishment of the foregoing and such other objects as will hereinafter appear, my invention consists in the movable eye sets and their relation one to the other, as hereinafter are more particularly described and sought to be defined in the claims. The specification is accompanied by drawings which show the preferred embodiments of my invention, and in which:

Fig. 1 is a rear elevation of an eye set embodying features of my invention;

Fig. 2 is a partial section through a doll's head fitted with the same taken at the line 2—2 in Fig. 1;

Fig. 3 is a detail of the eye shell;

Fig. 4 is a section taken in the plane of the line 4—4 in Fig. 1;

Fig. 5 is an elevation of a modified eye set;

Fig. 6 is a fragmentary section through a doll's head showing a rear elevation of modified supporting means in combination with the eye set of Fig. 5;

Fig. 7 is a horizontal section taken in the plane of the line 7—7 in Fig. 6; and Fig. 8 is an enlarged section taken in the plane of the line 8—8 in Fig. 6.

Referring to various modifications in the drawings, the eye set is seen to comprise in each case simply a pair of eyes E mounted on a cross rod C provided with a weight wire W. The cross rod C and eyes E are provided with mating means M for causing the eyes to rotate with the cross rod by permitting them to reciprocate freely along the cross rod in order that the eyes may automatically assume the spacing of the eye sockets in the doll's head to which the eye set is applied. The cross rod C is weakened preferably by flattening the same as at points F near the eyes E so that rotational adjustment of one eye relative to the other or/and a transverse or bending adjustment of one eye relative to the other may be obtained, as a result of which adjustments the eye set may be preliminarily adjusted to properly fit the eye sockets, regardless of whether the latter are or are not in true alignment, so that the eyes will look ahead and will focus in a natural and realistic manner. The weight wire W is made longer than usual and the excess length is bent downwardly around the cross rod C to form a stop S for limiting the movement of the eyes, and the size of the wire W, S is preferably so chosen that the stop S may be bent to permit of adjustment of the movement of the eyes.

Referring now more in detail to the form of eye set illustrated in Figs. 1 through 4, the cross rod C is hammered at its ends to form the feathers or keys 2, while the outer walls of the eye shells E have openings 4 cut therethrough which take the shape or are splined to fit the feathered ends of the cross rod C, as is best shown in Fig. 3. It should be noted that the feathered portion 2 of the cross rod is made of appreciable length so that the eyes E may reciprocate along the cross rod for an equivalent distance. Inward movement of the eyes E is limited by reason of the cross-shaped opening 4 in the outer wall of the eyes reaching the cylindrical portion 6 of the cross rod.

The inner walls of the eyes E have openings 8 cut therein which are round to fit the cross rod, and additionally provided with splines 10. The splines 10 make it possible to mount the eyes on the cross rod by simply sliding them over the ends thereof, while the round portion of the openings 8 provides a bearing support for the inner walls of the eyes on the cross rod which holds them accurately in place while permitting reciprocation thereof along the cross rod. After the eyes have been slipped onto the ends of the cross rod the feathered ends 2 of the latter may be hammered slightly to form the upset ends 12 which limit the outward movement of the eyes and retain the same permanently on the cross rod.

The cross rod C may be made weak enough to permit of relative rotation or torsional adjustment of one eye with respect to the other and also transverse adjustment of one eye with respect to the other, but I find it preferable to make the cross rod C sufficient in diameter to be rugged and strong and to facilitate the formation of the feathered ends 2 thereon. Such a cross rod may be flattened slightly as at the points F near the eyes E so as to weaken the otherwise rigid cross rod at these points, and thus to facilitate rotational and transverse adjustment of one of the eyes with respect to the other.

The weight wire W is attached to the cross rod preferably by welding and is provided at its lower end with a suitable pendant weight 14 which, under the influence of gravity, operates to open and close the eyes in the conventional manner. The other end of the weight wire W is bent downwardly around the cross rod to form the stop S, and this is made of sufficient length to bear against any desired portion of the inner wall of the doll's head, as is most clearly illustrated in Fig. 2. By making the wire S bendable the limit of movement, particularly the opening movement of the eyes, may be adjusted as desired in order to insure that the eyes when open will look straight ahead and not too far downwardly or upwardly. This adjustment of the stop S may, if desired, be made after the eye set has been completely mounted in position, for by pushing the weight 14 toward the front of the doll's head the wires S and W may be moved toward one another until the eyes are seen to look straight ahead.

A modified form of eye set is illustrated in Figs. 5 through 8, and referring to these figures it will be observed that the cross rod C is flattened for a considerable portion of its length 20 and, if desired, the resulting flattened portion may be expanded further in width by cutting and spreading the middle thereof to form the slots 22. The inner walls of the eyes E are provided with openings 24 which are round to take the cross rod C and splined as at 26 to take the flattened portion 20 of the cross rod. The openings in the outer walls of the eyes E may be slots designed to take only the flattened portion 20 of the cross rod or, for the sake of simplicity and uniformity, may coincide with the openings 24 provided on the inner walls of the eyes. The latter arrangement is preferred and is here illustrated by the opening 28 in Fig. 7. The splined portion of such an opening causes the outer wall of the eye to fit the cross rod as accurately as though a slot had been used. With this construction the eyes may be slipped over the ends of the cross rod and the ends of the cross rod may then be slit and spread to form the riveted or upset ends 30, as is best shown in Figs. 5 and 7, which limit the outward movement of and retain the eyes on the cross rod. The inward movement in the present arrangement is not limited except by the weight wire W. This inward movement may be limited, if desired, by simply making the openings 28 in the outer walls of the eyes in the form of slots rather than splined openings, the action being quite similar to that described in connection with the first described form of eye set. It will be appreciated that limiting the reciprocation of the eyes on the cross rod is a refinement rather than a necessity, because in practice the eyes are held in the eye sockets as is illustrated, for example, by Fig. 7 of the drawings.

The weight wire W is provided with a weight 14 and the other end of the wire is bent downwardly around the cross rod to form the stop S, exactly as was described in connection with the first form of eye set, and the adjustment of the open position of the eyes may be obtained in a similar manner.

The eye sets so far described may be supported in any desired manner within the doll's head. By way of illustration two suitable carriers for the eye set will next be described, and while these are each shown in connection with a different one of the eye sets already described, it should be understood that the eye sets and the supporting means therefor are interchangeable, for either eye set may be used with either carrier as well as with other forms of carrier not shown.

The supporting means or carriers are designated by the letter B and each include resilient means R urging the cross rod C and the eyes E thereon toward the eye sockets or eye openings in the doll's head. The carriers B are also provided with prongs P adapted to be imbedded in the material of the doll's head.

The carrier shown in Figs. 1 and 2, considered more in detail, consists of a plate of sheet metal 32 stamped approximately to the configuration shown in Fig. 1, except for the addition of prongs P and lugs or arms 34. The prongs P are bent forwardly at a suitable angle so that when imbedded into the material in the forward portion of the doll's head they will anchor the plate 32 securely in place. The lugs 34 are bent backward and are provided with slots 36 for receiving and carrying the cross rod C. The spring R is preferably made in the hairpin shape shown, the closed end of the hairpin being anchored in slots 38 in the plate 32 and the open end of the hairpin bearing against the cross rod C and urging it toward the front of the doll's head. The legs of the hairpin spring are located on either side of the weight wire W and prevent sideward movement of the cross rod.

To mount either of the eye sets previously described in this carrier the cross rod C is first passed through the slots 36. The weight wire W is next positioned around the cross rod C and spot-welded in place. The eyes E are slid over the ends of the cross rod and then are hammered to upset the same and thereby retain the eyes in place. If desired, the eyes may be mounted on the cross rod before the weight wire is welded thereto. By making the slots 36 open at the rear ends thereof the eye set may be completely assembled and then slid into place and retained in the open ended slots by the spring R. However, such an arrangement would have the disadvantage that a strong push against the eyes from the outside of the doll's head might push the cross rod entirely out of the slots, this movement being opposed only by the spring.

The carrier illustrated in Figs. 6, 7 and 8 is in the form of a bridge extending horizontally from one side to the other of the doll's head. The body of the bridge is bent over to form channels 40 which receive and frictionally engage attaching plates 42. The ends of the latter are provided with prongs P and with stop lugs or shoulders 44. The bridge is also provided with a pair of forwardly extending arms 46 in which open ended slots 48 are cut. The resilient means R comprises an arched spring 49 having a pair of forwardly extending arms, the four depending legs of which straddle the forwardly extending arms 46 of the bridge, and which additionally has a pair of lugs 50 nesting within the forwardly extending arms 46 which bear against the cross rod C and apply the spring pressure thereto.

With the present carrier it is merely necessary to push either of the eye sets into the open ends of the slots 48 against the spring R, and thereafter to mount the eye set within the doll's head by separating the plates 42 so as to imbed the prongs P in the material of the doll's head. A special tool may be used to support the bridge and eye set and to expand the bridge within the doll's head in a manner described in my Patent No. 1,621,073 issued March 15, 1927.

The manner of constructing and using the eye set and supporting means therefor embodying the present invention will, it is believed, be apparent from the foregoing description thereof. The eye set is exceedingly simple, consisting only of a pair of eyes, a cross rod and a weight wire, and therefore may be manufactured economically. In spite of the simple construction of the eye set various adjustments are provided for. The spacing between the eyes is adjustable automatically, although the eyes are forced to turn with the cross rod and without external means other than the cross rod and the eyes themselves. Relative rotation and transverse movement of one eye with respect to the other for preliminary adjustment of the eye set to the eye sockets of the doll's head may be readily obtained. Suitable means for limiting the opening movement of the eyes is provided for by a downward extension of the weight wire, thereby dispensing with the extra material usually provided within the doll's head and the resilient bumper usually provided on the weight for contacting with the same and adjustment of the open position of the eyes may be made. The supporting means for the eye set are likewise comparatively simple and economical to manufacture and possess the advantage of causing the eyes to be resiliently urged against the eye sockets, thereby obtaining the desired close fit and frictional engagement therebetween. The mounting of the eye set carrier is by means of prongs embedded in the material of the doll's head, which is preferable for secure and permanent attachment.

It will be apparent that while I have shown and described my invention in the preferred forms, many changes and modifications may be made in the structures disclosed without departing from the spirit of the invention, defined in the following claims.

I claim:

1. A movable eye set comprising a cross rod, a pair of substantially hemispherical eye shells, and means on said cross rod mating directly with mating means cut through the side walls of said eye shells and thereby directly causing the eye shells to rotate with the cross rod but normally permitting them to reciprocate freely along the cross rod, in order that the eye shells may automatically and freely adjust themselves in use to the spacing of the eye sockets in the doll's head to which the eye set is applied.

2. A movable eye set comprising a cross rod, and a pair of substantially hemispherical eye shells, said cross rod and eye shells being feathered and splined to cause the eye shells to rotate with the cross rod while normally permitting them to reciprocate freely along the cross rod, in order that the eye shells may automatically and freely adjust themselves in use to the spacing of the eye sockets in the doll's head to which the eye set is applied, and the ends of said cross rod being upset to retain the eye shells thereon.

3. A movable eye set comprising a rotatable cross rod, a pair of eye shells, means on said cross rod mating directly with mating means cut through the side walls of said eye shells and thereby directly causing the eyes to rotate with the cross rod, a pendant weight attached to said cross rod by means of a wire welded to the cross rod, said wire being bent around the cross rod and extended downwardly, the resulting downward extension being properly dimensioned to act as a stop for limiting the opening movement of the eyes, and being bendable so that the opening movement of the eyes may be adjusted to fit the doll's head in which the eye set is mounted.

4. A movable eye set comprising a rotatable cross rod, a pair of substantially hemispherical eye shells, means on said cross rod mating directly with mating means cut through the side walls of said eye shells and thereby directly causing the eye shells to rotate with the cross rod but normally permitting them in use to reciprocate freely along the cross rod, and a carrier for rotatably supporting said eye set in the doll's head including resilient means urging the cross rod toward the eye sockets, and prongs adapted to be imbedded in the material of the doll's head.

5. A movable eye set comprising a rotatable cross rod, a pair of eyes, means on said cross rod mating directly with mating means cut through the side walls of said eye shells and thereby directly causing the eyes to rotate with the cross rod but normally permitting them in use to reciprocate freely along the cross rod, said cross rod being weakened to permit preliminary adjustment of one eye with respect to the other rotationally or/and transversely, a weight wire attached to the cross rod and bent around the cross rod and extending downwardly to act as a stop for limiting the movement of the eye set and being bendable to permit adjustment of said movement, and a carrier for rotatably supporting said eye set in the doll's head having slotted bearings in which the cross rod is reciprocably mounted, resilient means urging the cross rod forwardly in the bearings toward the eye sockets, and relatively movable prongs adapted to be imbedded in the material of the doll's head.

6. A movable eye set comprising a pair of eyes, a rotatable generally straight cylindrical cross rod passing through the center of curvature of the eyes, and means causing the eyes to rotate with the cross rod about the axis of the cross rod, said cross rod being so weakened at a point lying substantially in the axis of rotation of the cross rod and eyes that rotational adjustment of one eye relative to the other may readily be obtained by twisting of the rod.

7. A movable eye set comprising a pair of eyes, a rotatable generally straight cylindrical cross rod passing through the center of curvature of the eyes, and mating means on said cross rod and eyes causing the eyes to rotate with the cross rod about the axis of the cross rod, said cross rod being weakened at points near the eyes and lying substantially in the axis of rotation of the cross rod and eyes so that rotational adjustment of one eye relative to the other and transverse adjustment of one eye relative to the other may be obtained by distortion of the cross rod, whereby said eye set may be adjusted to properly fit the said eye sockets.

8. A movable eye set comprising a rotatable cross rod, a pair of eyes, means causing the eyes to rotate with the cross rod, a weight wire attached to the cross rod, said wire being bent around the cross rod and extended downwardly, the resulting downward extension being properly dimensioned to bear against the frontal portion of the doll's head in order to act as a stop for limiting the movement of the eyes, and being bendable to permit adjustment of said movement.

9. A movable eye set comprising a pair of substantially hemispherical eye shells, a rotatable generally straight cylindrical cross rod passing through the center of curvature of the eye shells, and mating means on said cross rod and eye shells causing the eye shells to rotate with the cross rod about the axis of the cross rod, but normally permitting them in use to reciprocate freely along the cross rod, said cross rod being weakened at a point lying substantially in the axis of rotation of the cross rod and eyes to permit preliminary adjustment of one eye shell with respect to the other rotationally or/and transversely by distortion of the cross rod.

10. A movable eye set comprising a rotatable generally straight cylindrical cross rod, a pair of eyes, means causing the eyes to rotate with the cross rod about the axis of the cross rod, but normally permitting them in use to reciprocate freely along the cross rod, and a weight wire attached to the cross rod and bent around the cross rod and extended downwardly, the resulting downward extension being properly dimensioned to bear against the frontal portion of the doll's head in order to act as a stop for limiting the opening movement of the eye set and being bendable to permit adjustment of said movement.

11. A movable eye set comprising a pair of eyes, a rotatable generally straight cylindrical cross rod passing through the center of curvature of the eyes, means causing the eyes to rotate with the cross rod about the axis of the cross rod, said cross rod being weakened at a point lying substantially in the axis of rotation of the cross rod and eyes to permit preliminary adjustment of one eye with respect to the other both rotationally or/and transversely by distortion of the cross rod, and a weight wire attached to the cross rod and bent around the cross rod and extended downwardly, the resulting downward extension being properly dimensioned to bear against the frontal portion of the doll's head in order to act as a stop for limiting the opening movement of the eye set and being bendable to permit adjustment of said movement.

12. A movable eye set comprising a pair of eyes, a rotatable generally straight cylindrical cross rod passing through the center of curvature of the eyes, means causing the eyes to rotate with the cross rod about the axis of the cross rod, but normally permitting them in use to reciprocate freely along the cross rod, said cross rod being weakened at a point lying substantially in the axis of rotation of the cross rod and eyes to permit preliminary adjustment of one eye with respect to the other rotationally or/and transversely by distortion of the cross rod, and a weight wire attached to the cross rod and bent around the cross rod and extended downwardly, the resulting downward extension being properly dimensioned to bear against the frontal portion of the doll's head in order to act as a stop for limiting the opening movement of the eye set.

13. A movable eye set comprising a pair of eyes, a rotatable generally straight cylindrical cross rod passing through the center of curvature of the eyes, mating means on said cross rod mating directly with mating means cut through the side walls of said eyes and thereby directly causing the eyes to rotate with the cross rod about the axis of the cross rod, but normally permitting them in use to reciprocate freely along the cross rod, said cross rod being weakened at points adjacent the eyes to permit preliminary adjustment of one eye with respect to the other rotationally or/and transversely by distortion of the cross rod, and a weight wire attached to the cross rod and bent around the cross rod and extended downwardly, the resulting downward extension being properly dimensioned to bear against the frontal portion of the doll's head in order to act as a stop for limiting the opening movement of the eye set and being bendable to permit adjustment of said movement.

14. A movable eye set comprising a pair of substantially hemispherical eye shells, a rotatable generally straight cylindrical cross rod passing through the center of curvature of the eye shells, mating means on said cross rod and eye shells causing the eye shells to rotate with the cross rod about the axis of the cross rod, but normally permitting them in use to reciprocate freely along the cross rod, said cross rod being weakened at a point lying substantially in the axis of rotation of the cross rod and eyes to permit preliminary adjustment of one eye shell with respect to the other rotationally or/and transversely by distortion of the cross rod, and a carrier for rotatably supporting said eye set in the doll's head including resilient means urging the cross rod toward the eye sockets, and prongs adapted to be imbedded in the material of the doll's head.

15. A movable eye set comprising a rotatable cross rod, a pair of eyes, means causing the eyes to rotate with the cross rod but normally permitting them in use to reciprocate freely along the cross rod, a weight wire attached to the cross rod and bent around the cross rod and extended downwardly, the resulting downward extension being properly dimensioned to bear against the frontal portion of the doll's head in order to act as a stop for limiting the opening movement of the eye set and being bendable to permit adjustment of said movement, and a carrier for rotatably supporting said eye set in the doll's head including means urging the cross rod toward the eye sockets, and prongs adapted to be imbedded in the material of the doll's head.

16. A movable eye set comprising a pair of eyes, a rotatable generally straight cylindrical cross rod passing through the center of curvature of the eyes, means causing the eyes to rotate with the cross rod about the axis of the cross rod, but normally permitting them in use to reciprocate freely along the cross rod, said cross rod being weakened at a point lying substantially in the axis of rotation of the cross rod and eyes to permit preliminary adjustment of one eye with respect to the other rotationally or/and transversely by distortion of the cross rod, a weight wire attached to the cross rod and bent around the cross rod and extended downwardly, the resulting downward extension being properly dimensioned to bear against the frontal portion of the doll's head in order to act as a stop for limiting the movement of the eye set, and a carrier for rotatably supporting said eye set in the doll's head including resilient means urging the cross rod toward the eye sockets, and prongs adapted to be imbedded in the material of the doll's head.

Signed at New York, in the county of New York and State of New York this 29th day of April, A. D. 1930.

ALEXANDER KONOFF.